United States Patent
Kasao et al.

(10) Patent No.: US 6,584,457 B1
(45) Date of Patent: *Jun. 24, 2003

(54) PARALLEL DATA BASE RECORD DISTRIBUTION METHOD AND PARALLEL DATA BASE MANAGEMENT SYSTEM

(75) Inventors: Hideaki Kasao, Fujisawa (JP); Keisuke Toda, Fujisawa (JP); Kota Yamaguchi, Yamato (JP); Kazuo Masai, Yokohama (JP); Kiyomi Hirohata, Yokohama (JP)

(73) Assignees: Hitachi, Ltd., Tokyo (JP); Hitachi Software Engineering Co., Ltd., Yokohama (JP)

( * ) Notice: Subject to any disclaimer, the term of this patent is extended or adjusted under 35 U.S.C. 154(b) by 164 days.

This patent is subject to a terminal disclaimer.

(21) Appl. No.: 09/662,911

(22) Filed: Sep. 15, 2000

Related U.S. Application Data

(63) Continuation of application No. 09/292,606, filed on Apr. 15, 1999, which is a continuation of application No. 08/840,643, filed on Apr. 25, 1997, now Pat. No. 5,987,462.

(30) Foreign Application Priority Data

Apr. 26, 1996 (JP) .............................................. 8-106815

(51) Int. Cl.⁷ .......................... G06F 17/30; G06F 15/16
(52) U.S. Cl. ............................... 707/1; 707/3; 707/10; 707/104.1; 707/103 R; 709/224
(58) Field of Search ........................ 707/4, 10, 203, 707/2, 6, 103, 201, 1, 3, 104.1, 103 R; 709/224; 711/171

(56) References Cited

U.S. PATENT DOCUMENTS

| | | | |
|---|---|---|---|
| 5,032,987 A | 7/1991 | Broder et al. | 364/200 |
| 5,055,999 A | 10/1991 | Frank et al. | 364/200 |
| 5,109,508 A | 4/1992 | Mitsumori et al. | 707/3 |
| 5,237,691 A | 8/1993 | Robinson et al. | 395/700 |
| 5,251,318 A | 10/1993 | Nitta et al. | 395/725 |
| 5,301,337 A | 4/1994 | Wells et al. | 395/800 |
| 5,349,479 A * | 9/1994 | Arimura et al. | 360/73.06 |
| 5,493,668 A | 2/1996 | Elko et al. | 395/457 |
| 5,515,531 A | 5/1996 | Fujiwara et al. | 707/3 |
| 5,544,345 A | 8/1996 | Carpenter et al. | 395/477 |
| 5,586,292 A | 12/1996 | Yamaguchi | 395/441 |
| 5,634,125 A * | 5/1997 | Li | 707/203 |
| 5,655,080 A | 8/1997 | Dias et al. | 395/200.32 |
| 5,687,369 A * | 11/1997 | Li | 707/203 |
| 5,717,906 A | 2/1998 | Aratani | 395/508 |
| 5,724,600 A | 3/1998 | Ogi | 395/800 |
| 5,727,197 A | 3/1998 | Burgess et al. | 707/2 |
| 5,742,806 A | 4/1998 | Reiner et al. | 707/10 |
| 5,819,083 A * | 10/1998 | Chen et al. | 707/10 |
| 5,878,409 A * | 3/1999 | Baru et al. | 707/2 |
| 5,940,289 A * | 8/1999 | Iwata et al. | 364/131 |
| 5,970,495 A * | 10/1999 | Baru et al. | 707/102 |
| 5,987,462 A | 11/1999 | Kasao et al. | 707/10 |
| 6,026,482 A * | 2/2000 | Witt et al. | 712/215 |
| 6,101,495 A * | 8/2000 | Tsuchida et al. | 707/4 |
| 6,169,982 B1 * | 1/2001 | Kasao et al. | 707/1 |
| 6,192,359 B1 * | 2/2001 | Tsuchida et al. | 707/4 |
| 6,230,247 B1 * | 5/2001 | Cannon et al. | 711/171 |
| 6,282,570 B1 * | 8/2001 | Leung et al. | 709/224 |
| 6,353,833 B1 * | 3/2002 | Bird et al. | 707/201 |
| 6,363,396 B1 * | 3/2002 | Klots et al. | 707/103 |
| 6,405,198 B1 * | 6/2002 | Bitar et al. | 707/6 |

FOREIGN PATENT DOCUMENTS

| | | | |
|---|---|---|---|
| EP | 0 600 733 A2 * | 8/1994 | ........... G11B/20/18 |
| JP | 2113349 | 4/1990 | |
| JP | 4160475 | 6/1992 | |
| JP | 6103127 | 4/1994 | |

* cited by examiner

*Primary Examiner*—Frantz Coby
(74) *Attorney, Agent, or Firm*—Antonelli, Terry, Stout & Kraus, LLP

(57) ABSTRACT

A parallel data base management system with a data base divided into a plurality of external memory units is disclosed. A control CPU, upon receipt of a request for access to the data base, decides whether the access request is for storing or searching a record. For a record storage request, the control CPU determines an external memory unit to store the record using a hash function. In the case of a record search request, on the other hand, all the external memory units are searched in parallel without using the hash function thereby to obtain the desired record. The hash function is altered upon addition of an external memory unit.

16 Claims, 6 Drawing Sheets

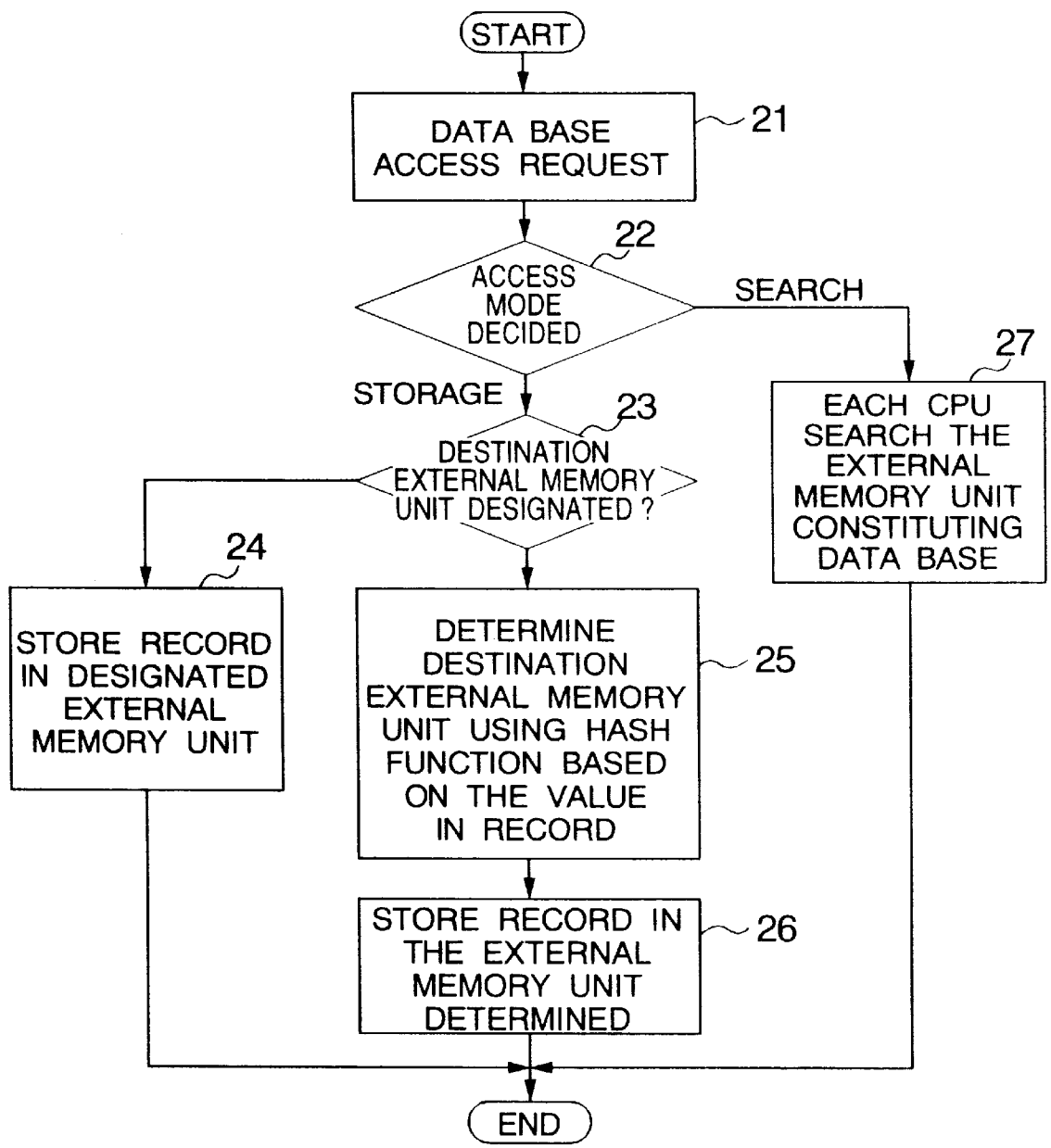

FIG. 3A 10-4 {
| NUMBER OF DIVISIONS, BASE OF HASH FUNCTION ~10-41 | |
|---|---|
| HASHING CALCU-LATION RESULT | EXTERNAL MEMORY UNIT MANAGEMENT NO. AFTER ALTERATION 10-42 |
| ⋮ | ⋮ |
| ⋮ | ⋮ |

FIG. 3B

INITIAL STATUS (BEFORE ALTERING HASH FUNCTION)

10-4 {
2  ~10-41

| | 10-42 |
|---|---|
| 0 | 1 |
| 1 | 2 |

FIG. 3C

HASH FUNCTION UNDER TEMPORARY ALTERATION 10-4 {
4  ~10-41

| | 10-42 |
|---|---|
| 0 | 1 |
| 1 | 2 |
| 2 | 3 |
| 3 | 3 |

FIG. 3D

HASH FUNCTION AFTER TEMPORARY ALTERATION 10-4 {
3  ~10-41

| | 10-42 |
|---|---|
| 0 | 1 |
| 1 | 2 |
| 2 | 3 |

PARALLEL DATA BASE RECORD DISTRIBUTION METHOD AND PARALLEL DATA BASE MANAGEMENT SYSTEM

This is a continuation of application Ser. No. 09/292,606, filed Apr. 15, 1999; which is a continuation of Ser. No. 08/840,643, filed Apr. 25, 1997, now U.S. Pat. No. 5,987, 462.

BACKGROUND OF THE INVENTION

The present invention relates to a parallel data base record distribution method and a parallel data base management system, or more particular to a record distribution method and a management system capable of managing the addition of a database unit in a parallel data base management system including a plurality of database units in versatile way.

Conventionally, when a large amount of records are to be distributed equally among a plurality of database units of a parallel database management system, a hash function is used in view of a high level of versatility against the increase in the number of records with a small overhead for distribution. In such a case, the hash function is used for both the preparation and addition of a record and the search of the record. In other words, when a new record, which has been prepared is stored in a parallel database, the hash function is used to determine a data base unit to stores it in, and when searching for the desired record, the same hash function is used to determine the data base unit having the record stored therein.

The hash function is used in the systems described in JP-A-2-113349, JP-A-4-160475 and JP-A-6-103127, for example.

As described above, the use of the hash function for both the preparation/addition of a record and the record search poses the following problems:

(1) The hash function and the result of the hashing (calculation using the hash function) depend on the actual number of divisions (the number of database units) for the parallel data base management system. Therefore, when a data base unit is added in the parallel data base management system, i.e., when the number of divisions is changed, it is necessary to redistribute the entire record stored so far among the data base units using the new hash function depending on the changed number of divisions. This imposes a great burden and makes an efficient operation of the parallel data base impossible.

(2) Even when a data base unit is added without redistributing (restoring) the record, the record is not stored in the newly-added data base unit, and it is impossible to distribute the record equally among the data base units.

SUMMARY OF THE INVENTION

The present invention has been developed to solve the above-mentioned problem points, and the object of the present invention is to provide a record distribution method and a management system capable of meeting a change in the number of data base divisions in a versatile manner in a parallel data base management system for managing a data base divided among a plurality of data base units.

The above-mentioned object of the invention is achieved by changing the hash function used for storing a record when a data base unit is added in a parallel data base management system for managing a data base divided among a plurality of data base units.

Also, the above-mentioned object of the invention is achieved by a parallel data base management system for managing a data base divided among a plurality of data base units, in which the hash function is used for storing a record and the record is searched/updated without using the hash function.

Further, the above-mentioned object of the present invention is achieved by a parallel data base management system for managing a data base divided among a plurality of data base units, in which a record is stored in an added data base unit in a greater proportion than in other data base data units for a predetermined length of time.

The above-mentioned object may be achieved by a parallel data base management system comprising the function of registering the configuration of an external memory unit for storing a data base in divided portions and referencing and altering the contents of the registered configuration, the function of uniquely determining an external memory unit for storing a record from among the external memory units registered in the data base configuration information register using the hash function as a record value, the function of storing and adding a record in an arbitrary external memory unit constituting the data base, and the function of searching for and updating a record in an arbitrary external memory unit constituting the data base. At the time of preparing and adding a record, the storage position determining function and the record storage and addition function are used to store and add the record, so that all the external memory units constituting the data base are searched concurrently using the record search and update function without using the storage position determining function at the time of record search and update, and at the time of changing the number of divisions of the data base as when a CPU is added, the data are stored mainly in an arbitrary added external memory unit.

Also, the above-mentioned object is achieved by a parallel data base management system having the function of storing the average record increase per unit time in the data base and storing the number of records in the external memory units, and the function of storing the records in an added external memory unit by altering the hash function only during the time proportional to the number of records in the external memory units divided by the average amount of increase in the records when altering the number of data base divisions, and the function of securing, during the subsequent record addition, equal storage of the records that have been found unequal at the time of altering the number of data base divisions.

Further, the above-mentioned object of the invention can be achieved by a parallel data base management system having the function of storing the number of records stored in each of the external memory units and the function of moving records to a newly added external memory unit in a CPU from each of the existing external memory units by the number of records in the existing external memory units before altering the number of data base divisions, divided by an altered number of data base divisions, in order to assure storage of equal records among the external memory units of the system.

BRIEF DESCRIPTION OF THE DRAWINGS

FIG. 2 is a flowchart showing the record search process according to the embodiment shown in FIG. 1.

FIGS. 3A and 3D are diagrams showing a change in the contents of a control table when the hash function used in the embodiment of FIG. 1 is altered.

DESCRIPTION OF THE PREFERRED EMBODIMENTS

Figure 1:
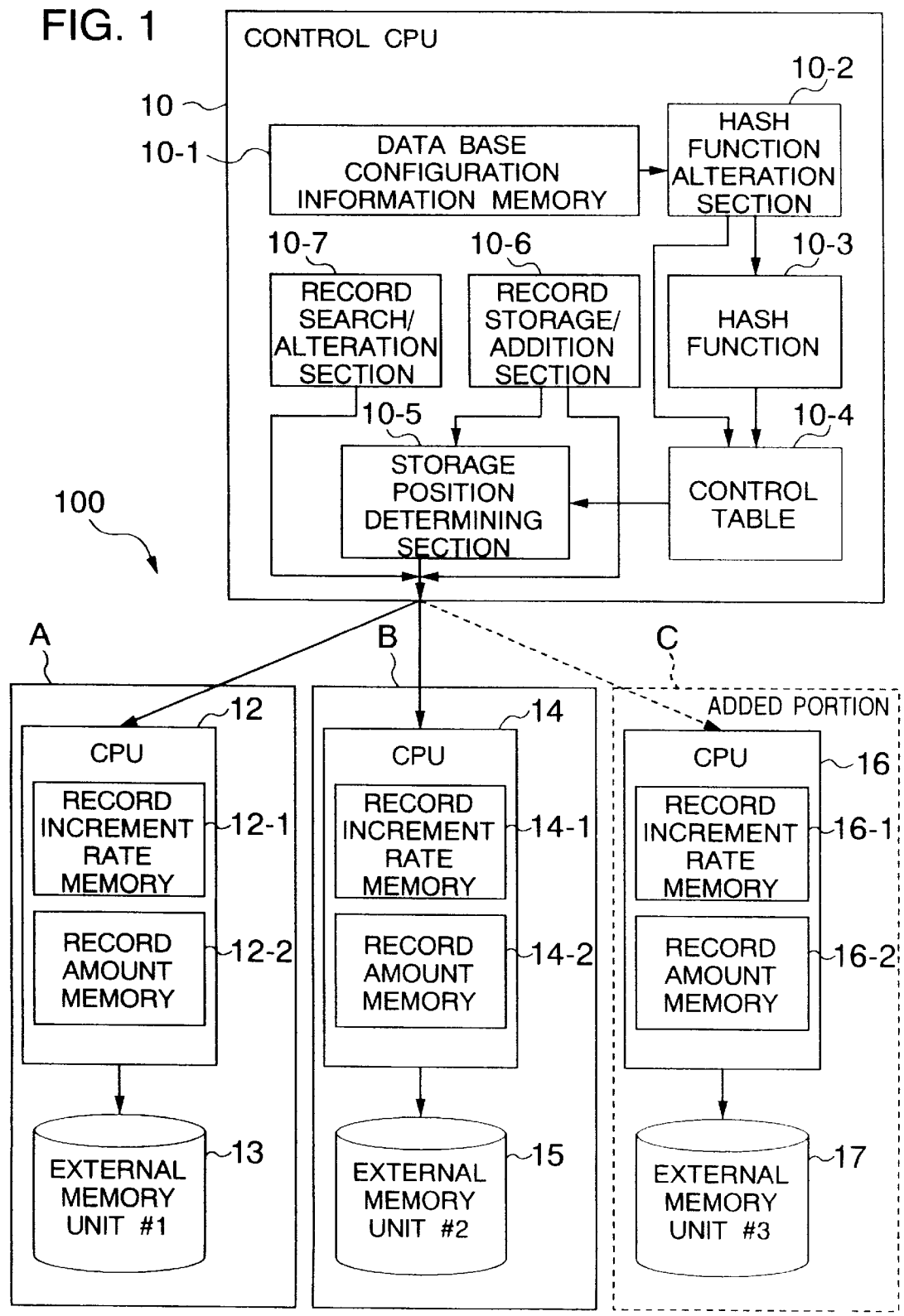
FIG. 1 is a diagram showing a general configuration of a parallel data base management system according to an embodiment of the present invention.

An embodiment of the present invention will be described below with reference to the accompanying drawings. FIG. 1 is a schematic diagram showing a configuration of a parallel data base management system according to an embodiment of the invention.

A parallel data base management system 100 shown in FIG. 1 comprises a plurality of data base units A and B for storing the data base records in divisions, and a central processing unit (CPU) 10 used for control. The control CPU 100 receives a data base access request from an application program, determines an external memory unit of the data base unit to which the access request is destined, and hands over the control to the CPU of the data base unit to which the access request is destined.

The data base unit A includes an external memory unit 13 for storing the record distributed thereto, and a CPU 12 for executing the search and storage of the record stored in the external memory unit 13. In similar fashion, the data base unit B includes an external memory unit 15 for storing the record distributed to the particular data base unit and a CPU 14 for executing the search and storage of the record stored in the external memory unit 15.

The CPUs 12 and 14 include record increment rate memory sections 12-1 and 14-1, and record amount memory sections 12-2 and 14-2, respectively. Each CPU increments the count value stored in the record amount memory section associated therewith each time the record is added to the external memory unit associated therewith. Also, each CPU calculates the record increment rate per unit time in the associated external memory unit and stores it in the associated record increment rate memory section. These counts and record increment rates are used for the processing described below.

The storage and search of the record under normal state of the parallel data base management system 100 shown in FIG. 1 will be described with reference to the flowchart shown in FIG. 2.

In FIG. 2, upon receipt of an external access request to the data base for execution of an application program (step 21), the control CPU 10 decides whether the access request is for storage or search of the record (step 22).

When the request is for record storage, the presence or absence of the designation of an external memory unit for storage is determined (step 23). When an external memory unit for storing the record is designated, the particular record is stored in the designated external memory unit (step 24).

When the external memory unit to store the particular record is not designated, the hashing calculation is conducted using the prevailing hash function with the predetermined data portion in the record as an input value. The external memory unit for storing the record is determined from the result of this hashing calculation (step 25). Specifically, the remainders obtained after the result of each hashing calculation is divided by the number of data base divisions (i.e., the number of data base units or the number of the external memory units) is rendered to correspond to the management numbers of the external memory units in advance. The external memory unit for storing the record thus is determined from the value of the remainder. The record is stored in the external memory unit thus determined (step 26).

In the record search, on the other hand, the hash function is not used for determining the external memory unit which stores the record searched for. Specifically, a related external memory unit is searched in each of the data base units A and B. The CPU having an external memory unit having stored therein the record searched for responds to the search request and sends the desired record to the control CPU 10 (step 27).

In this way, according to the embodiment of the invention shown in FIG. 1, the function of equally distributing the record based on the hashing calculation result is used only for storing the record.

Now, an explanation will be made regarding the case in which the data base unit C is newly added to the parallel data base management system 100 shown in FIG. 1. In the data base unit C, the CPU 16 and the external memory unit 17 have the functions similar to the other CPUs 12 and 14 and the other external memory units 13 and 15 of the data base units A and B, respectively. Also, in the data base unit C, the record increment rate memory section 16-1 and the record amount memory section 16-2 have the functions equivalent to the other record increment rate memory sections 12-1 and 14-1 and the other record amount memory sections 12-2 and 14-2 of the data base units A and B, respectively. The operation of the record increment rate memory section and the record amount memory section will be described later.

When the data base unit C is newly added, the information on the configuration of the external memory units in the data base configuration information memory section 10-1 is updated in the control CPU 10. Specifically, the number of database divisions changes from 2 to 3. In the control CPU 10, the hash function alteration section 10-2 changes the hash function 10-3 used for record storage on the basis of the updated system configuration information. It should be noted, however, that the hash function 10-3 is altered on the basis of 4, that is, the result of adding 1 to 3, i.e., the actual number of divisions of the data base. In other words, the hash function is altered such that the record is equally stored in the four external memory units as a result of the CPU 10 conducting the hashing calculation by the altered hash function 10-3.

The hash function alteration section 10-2 also updates the contents of the control table 10-4 based on the hash function 10-3 thus altered.

The record storage position determining section 10-5 sequentially stores the records in the actual three external memory units 13, 15 and 17 based on the contents of the control table 10-4.

In the case of record search, on the other hand, the record search/update section 10-7 of the control CPU 10 instructs each CPU of the data base units A, B and C to search the related external memory units.

The process performed by the control CPU 10 when the data base unit C is added will be explained in more detail with reference to the change in the contents of the control table 10-4 shown in FIGS. 3A to 3D.

The configuration of the control table 10-4 is shown in FIG. 3A. The control table 10-4 includes a division number storage register 10-41 for storing the number of divisions providing the base of the hash function and a correspondence table 10-42 for storing the management numbers of the external memory units in one-to-one correspondence relation for all the numerical values of the remainders obtained after dividing the hashing calculation result by the number of divisions.

In the parallel data management system shown in FIG. 1, the control table 10-4 initially assumes the status as shown in FIG. 3B. Specifically, the number of divisions on the register 10-41 is 2, in which case the hash function is determined on the basis of the number of divisions which is 2. The remainders after the hashing calculation are 0 and 1. Therefore, in the correspondence table 10-42, the external memory unit 13 of the management number #1 corresponds to the remainder of 0, and the external memory unit 15 of the management number #2 corresponds to the remainder 1.

Now, when the data base unit C is added, the control table 10-4 assumes the status as shown in FIG. 3C. Specifically, the register 10-41 has stored therein the temporary number of divisions 4 (=3 +1). At the same time, the hash function is temporarily altered on the basis of the temporary number of divisions which is 4. The remainders after the hashing calculation are 0, 1, 2 and 3. In the correspondence table 10-42, the external memory unit 13 of the management number #1 corresponds to the remainder 0, the external memory unit 15 of the management number #2 corresponds to the remainder 1, and the external memory unit 17 of the management number #3 corresponds to the remainders 2 and 3. It follows, therefore, that twice as many records are stored in the external memory unit 17 as in the other external memory units 13 and 15.

After the lapse of a predetermined length of time, assume that the number of records stored in the external memory units 13, 15 and 17 are substantially equal to each other. The control table 10-4 assumes the status as shown in FIG. 3D. Specifically, the number of divisions on the register 10-41 coincides with the actual number of divisions which is 3. At this time, the hash function is altered again on the basis of the actual number 3 of divisions, and then it remains unaltered until a data base unit is added. The remainders after the hashing calculation are 0, 1 and 2. In the correspondence table 10-42, the external memory unit 13 of the management number #1 corresponds to the remainder 0, the external memory unit 15 of the management number #2 corresponds to the remainder 1, and the external memory unit 17 of the management number #3 corresponds to the remainders 2 and 3. Subsequently, therefore, the records are stored in substantially an equal amount in the external memory units 13, 15 and 17.

Figure 4:
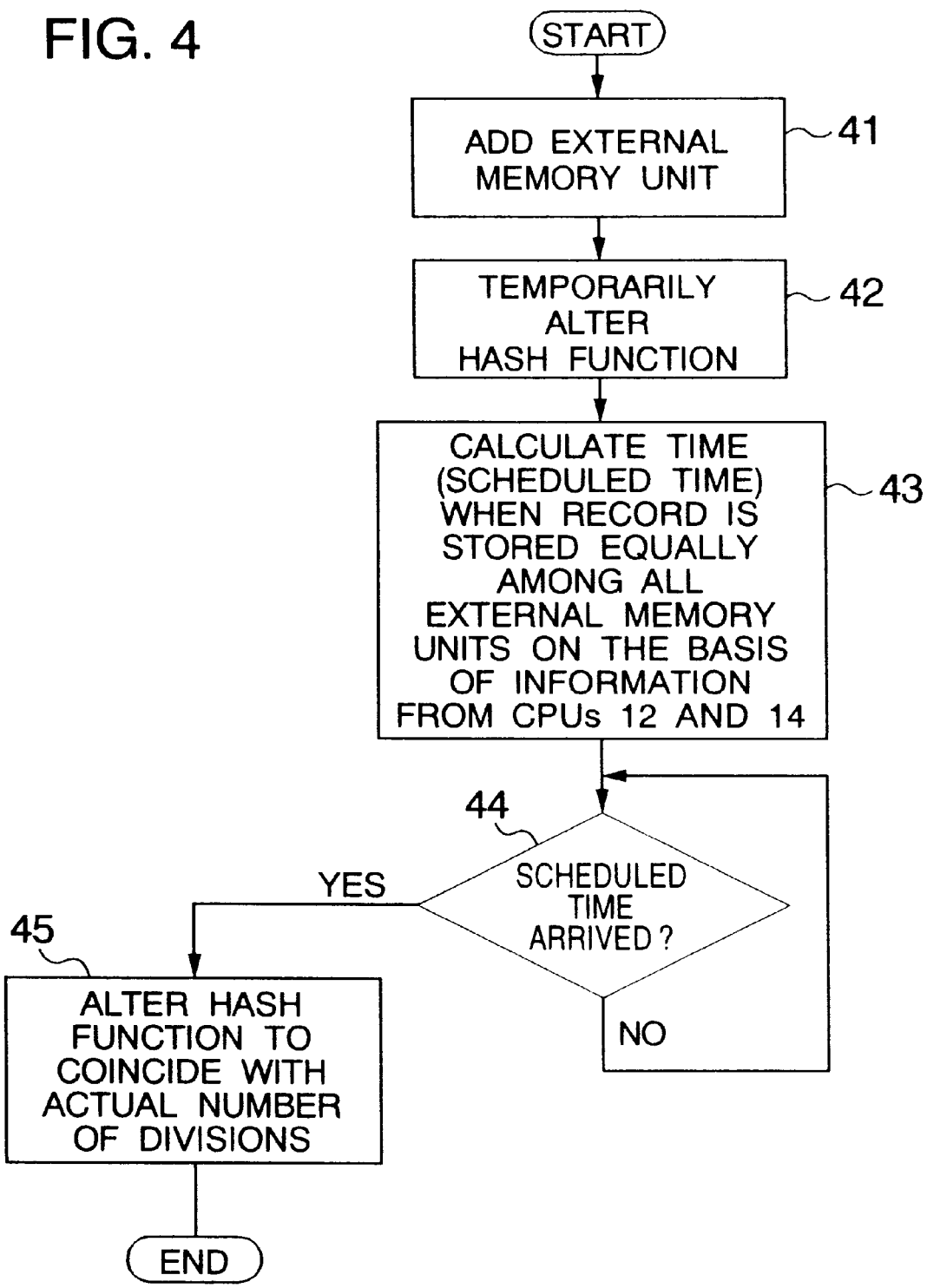
FIG. 4 is a flowchart showing the process of altering the hash function for a predetermined length of time according to the embodiment shown in FIG. 1.
Figure 5A:
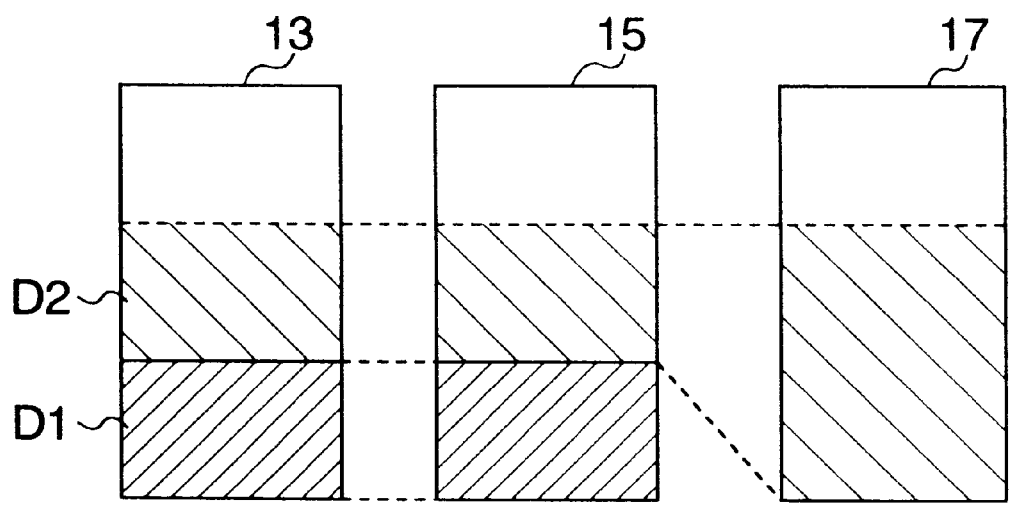
FIGS. 5A and 5B are diagrams schematically showing the storage of records in an external memory unit of each data base unit processed as shown in FIG. 4.

The process of the control CPU 10 shown in FIGS. 3C and 3D will be explained with reference to the flowchart of FIG. 4 and the diagram of FIG. 5A. In FIG. 5A, D1 designates the record already stored before data base unit addition, and D2 the record stored after addition.

With the addition of the external memory unit C (step 41), the hash function 10-3 is temporarily altered (step 42). Then, the control CPU 10 receives the information stored in the record increment rate memory sections 12-1 and 14-1 and the record amount memory sections 12-2 and 14-2 of the CPUs 12 and 14, determines a time length required until the records are stored substantially equally in the external memory units after addition of the external memory unit (FIG. 5A), and calculates a scheduled time when the amount of records becomes substantially equal in the external memory units on the basis of the length of time thus determined (Step 43). The control CPU 10 then monitors whether the scheduled time is reached or not (step 44) and when the scheduled time is reached, alters again the hash function on the basis of the actual number of divisions (step 45).

In step 43, the length of time thus determined indicates a temporary alteration time when the temporary alteration of the hash function is finished after the total amount of records (number of records: D1+D2) in all of the external memory units with the records distributed substantially equally among them after addition of an external memory unit (FIG. 5A) reaches a predetermined multiple of the total amount of records (number of records: D1) stored in all the external memory units before addition. In the embodiment shown in FIG. 5A, the multiple is set to three. The temporary alteration time can be determined as described below.

The difference between the total record amount after addition (D1+D2) and the total record amount before addition (D1) is divided by the average record increment rate per unit time for all the external memory units after addition to determine the temporary alteration time. Theoretically, the record increment rate of each external memory unit coincides with each other, and therefore, the record increment rate for a given external memory unit multiplied by the temporary number of divisions for the temporarily altered hash function (4 in FIG. 3C) may alternatively be used instead of the average record increment rate.

Figure 5B:
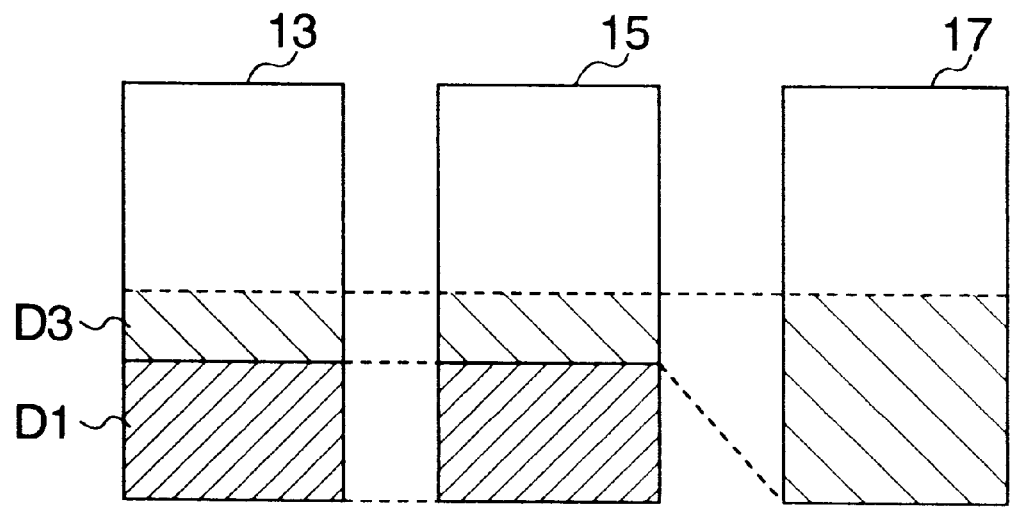

In the above-mentioned example, the temporary number of divisions for the temporarily altered hash function is the actual number of divisions plus 1 (=4). The invention, however, is not limited to this value. FIG. 5B shows the case in which the temporary number of divisions is the actual number of divisions plus 2 (=5). In this case, the hash function is temporarily altered on the basis of the temporary number 5 of divisions. The remainders after the hashing calculation are 0, 1, 2, 3 and 4. In the correspondence table 10-42, the external memory unit 13 of the management number #1 corresponds to the remainder 0, the external memory unit 15 of the management number #3 corresponds to the remainder 1, and the external memory unit 17 of the management number #3 corresponds to the remainders 2, 3 and 4. As a result, the external memory unit 17 can store three times the records as the other external memory units 13 and 15. Under this condition, the temporary alteration of the hash function is finished when the total record amount (D1+D3) in of the external memory units with the records substantially equally distributed among the external memory units after addition (FIG. 5B) reaches a value equivalent to ¾ times as large as the total record amount (i.e., the number of records equal to D1 in FIG. 5B, for example) stored in all of the external memory units before addition.

According to the above-mentioned embodiment, the record increment rate of a given database unit is stored in the particular database unit. Alternatively, the average record increment rate per unit time for all of the external memory units may be stored in the control CPU 10.

In the above-mentioned embodiment, the records before addition of a database unit are not moved. Since the hash function is not used for the record search/alteration process as described above, however, a part of the records before addition can be moved to the added unit at the time of addition of the database unit without adversely affecting the record search/alteration process. Consequently, the temporary alteration time of the hash function can be reduced or eliminated.

Figure 6:
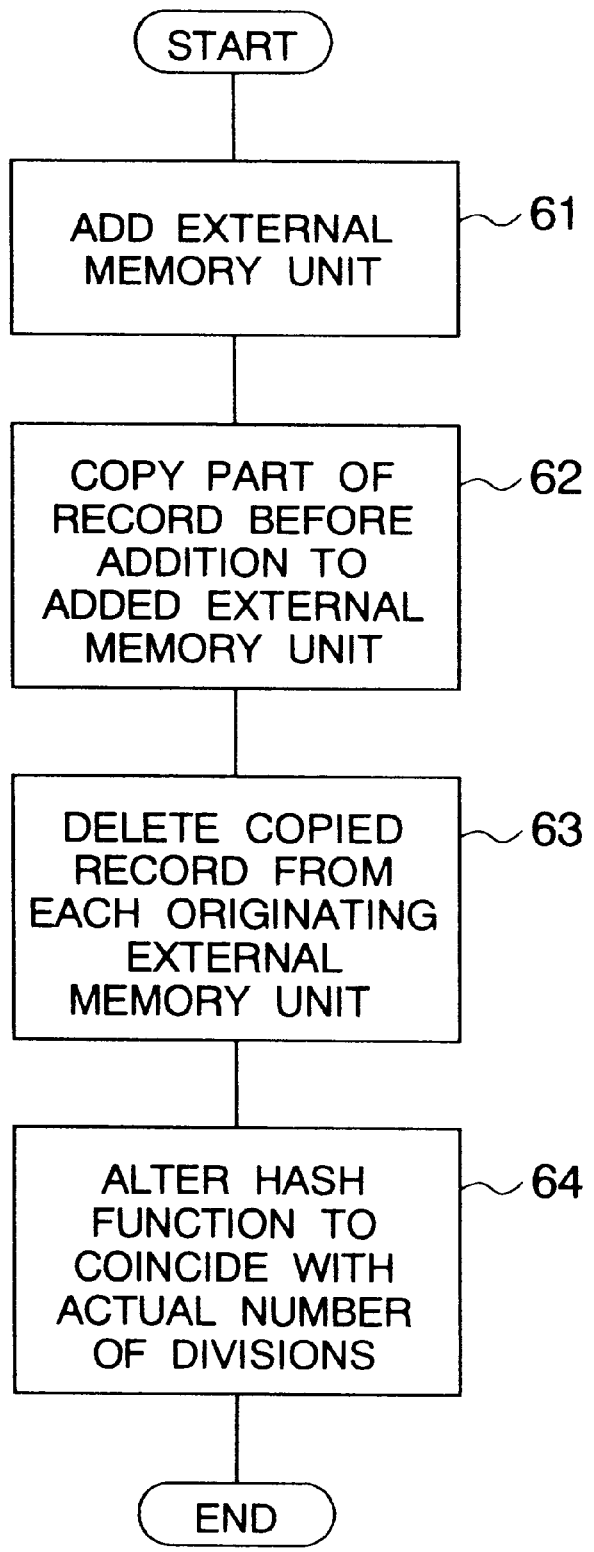
FIG. 6 is a diagram schematically showing the process of moving the records at the time of adding a data base unit.

The process of moving the record before addition shown in FIG. 6 will be explained with reference to the embodiment shown in FIG. 1. When the database unit C is added (step 61), one third of the record amount before addition (D1 of FIG. 5A) is moved to the external memory unit 17 from the external memory units 13 and 15. In this movement, an arbitrary record to be moved from the external memory units 13 and 15 is copied to the external memory unit 17 (step 62), and then the copied record is deleted from the the external memory units 13 and 15 (step 63). After complete deletion, the hash function is altered to the one conforming to the actual number of divisions (=3) (step 64). This movement process can be efficiently executed by each CPU during an unoccupied time when the record search/storage process is not executed in response to an access request from an application program.

Also, when three or more external memory units are involved, the record stored in one of them is copied or moved to the other external external memory units by the amount of the particular record divided by the number of the remaining external memory units. Then, the hash function is altered so that the record is stored only in the remaining external memory units. In this way, the desired one of the external memory units can be separated from the system without adversely affecting the operation of the parallel database management system.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A database management method for use in a database management system having a first storage area for storing a database, comprising the steps of:
    detecting a second storage area added to said database management system, and altering record assignment of records in such a manner that a number of records to be assigned to said second storage area is greater than a number of records to be assigned to said first storage area; and
    when a request for adding a record is input, storing said record selectively in one of said first and second storage areas based on the manner of record assignment.

2. The database management method according to claim 1, wherein said database management system decides whether or not an amount of records stored in said second storage area reaches a predetermined amount, and storing records in such a manner that a number of record storing times per unit time in said second storage area added is greater than a number of record storing times per unit time in said first storage area, until an amount of records in said second storage area has reached said predetermined amount.

3. A database management method according to claim 1, wherein a hash function is used in storing records, and the number of records stored per unit time is controlled by altering said hash function from a first hash function to a second hash function.

4. A database management method for use in a database management system having first and second storage area for storing a database, comprising the steps of:
    computing a difference between an amount of records stored in said first storage area and an amount of records stored in said second storage area; and
    when a request for adding a record is input, determining which one of said first and second storage areas to which a record should be stored, based on a computation result of the difference.

5. A database management method according to claim 4, wherein a hash function is used in storing records, and the number of records stored per unit time is controlled by altering said hash function from a first hash function to a second hash function.

6. A database management system having a first storage area for storing a database, comprising:
    a detection unit which detects a second storage area added to database system , and alters record assignment of records in such a manner that a number of records to be assigned to said second storage area is greater than a number of records to be assigned to said first storage area; and
    a control unit, responsive to when a request for adding a record is input, storing said record selectively in one of said first and second storage areas based on the manner of record assignment.

7. A database management system according to claim 6, wherein a hash function is used in storing records, and the number of records stored per unit time is controlled by altering said hash function from a first hash function to a second hash function.

8. A recording medium storing a database management program in a database management system having a first storage area for storing a database, wherein said program when executed causes said database management system to perform the steps of:
    detecting a second storage area added to said database management system, and altering record assignment of records in such a manner that a number of records to be assigned to said second storage area is greater than a number of records to be assigned to said first storage area; and
    when a request for adding a record is input, storing said record selectively in one of said first and second storage areas based on the manner of record assignment.

9. The recording medium storing the database management program according to claim 8, wherein said program when executed causes said database management system to further perform the steps of:
    deciding whether an amount of records stored in said second storage area reaches a predetermined amount; and
    storing records in such a manner that a number of record storing times per unit time in said second storage area is greater than a number of record storing times per unit time in said first storage area, until an amount of records in said second storage area has reached said predetermined amount.

10. A recording medium according to claim 8, wherein a hash function is used in storing records, and the number of records stored per unit time is controlled by altering said hash function from a first hash function to a second hash function.

11. A database management method for use in a database management system having a first storage area for storing a database, comprising the steps of:
    detecting a second storage area added to said database management system, and altering record assignment of records in such a manner that a number of records to be assigned to said second storage area is greater than a number of records to be assigned to said first storage area; and when a request for adding a record is input, storing said record selectively in one of said first and second storage areas based on the manner of record assignment.

12. A database management method according to claim 11, wherein a hash function is used in storing records, and the number of records stored per unit time is controlled by altering said hash function from a first hash function to a second hash function.

13. A database management method for use in a database management system having a first storage area for storing a database, said method comprising the steps of:

detecting a second storage area added to said database management system, and altering record assignment of records in such a manner that a number of records to be assigned to said second storage area is greater than a number of records to be assigned to said first storage area; and when a request for adding a record is input, storing said record selectively in one of said first and second storage areas based on the manner of record assignment.

14. A database management method according to claim 13, wherein a hash function is used in storing records, and the number of records stored per unit time is controlled by altering said hash function from a first hash function to a second hash function.

15. A database management method for use in a database management system having a first storage area for storing a database, comprising the steps of:

detecting a second storage area added to said database management system, and altering record assignment of records in such a manner that a number of records to be assigned to said second storage area is greater than a number of records to be assigned to said first storage area; and when a request for adding a record is input, storing said record selectively in one of said first and second storage areas based on the manner of record assignment.

16. A database management method according to claim 15, wherein a hash function is used in storing records, and the number of records stored per unit time is controlled by altering said hash function from a first hash function to a second hash function.

* * * * *